Jan. 28, 1969  G. T. ELIASSEN  3,424,320

CONVEYOR SYSTEM

Filed May 26, 1966  Sheet 1 of 7

INVENTOR.
Gunnar Thure Eliassen
BY
his ATTORNEY

United States Patent Office 3,424,320
Patented Jan. 28, 1969

3,424,320
CONVEYOR SYSTEM
Gunnar Thure Eliassen, Saffle, Sweden, assignor to Aktiebolaget Electrolux, Stockholm, Sweden, a corporation of Sweden
Filed May 26, 1966, Ser. No. 553,205
Claims priority, application Sweden, May 26, 1965, 6,993/65
U.S. Cl. 214—11        15 Claims
Int. Cl. B65g *43/00, 37/00*

ABSTRACT OF THE DISCLOSURE

An article handling system having a driven conveyor from which articles are discharged to a given one of a number of storage paths, a mechanical memory working in conjunction with the conveyor in which each article handled by the conveyor is represented by a free body like a ball, for example, which is fed forward through the mechanical memory in a path of movement defining a closed circuit, controlling the feeding of the balls in the mechanical memory, and, depending upon the positions of the balls, actuating devices arranged to control the advancing of the articles on the conveyor, the mechanical memory including a rotatable drum having spaced rows of notches or hollows about its periphery in which each ball, after seating in a notch, is moved by the drum, such movement of the ball defining one part of the path of movement for the ball during which the ball is raised while in physical contact with the drum, gravitation channels each defining another part of the path of movement for each ball during which the ball moves downward by gravity while out of physical contact with the drum, the gravitation channels being divided into collecting channels and memory channels, the collecting channels being arranged to receive the balls after they have completed at least one-half revolution around the drum and to deliver the balls, one at a time, to the memory channel when information about the destination of an article to a particular storage path is to be stored in the mechanical memory, the mechanical memory functioning to deliver the balls, one at a time, from the memory channel to the notches of the drum when an article is to be fed onto the conveyor and the articles corresponding to the balls are to be transported toward predetermined storage paths.

---

My invention relates to a conveyor system for sorting articles.

It has been proposed heretofore to sort articles on an article receiving conveyor by transferring the articles in a definite manner from the conveyor to a number of storage paths or lines. In such an arrangement a control unit is driven in synchronism with the article receiving conveyor, and, after stopping each article at a first zone of the conveyor, the control unit then initiates movement of each article from the first zone to any one of a number of transfer zones of the conveyor which are at different distances from the first zone and functions to remove the article automatically from the selected transfer zone on the conveyor to a particular article storage path or line. With this arrangement the control unit can exercise control over ultimate destination of the article on an article receiving conveyor only when movement of the article is initiated from the first zone at which it has been stopped. In fact, the control unit possesses the limitation that it can only exercise control over one article at a time when each successive article has been stopped at the first zone. When the control unit is under the supervision of an operator, for example, the operator must operate the control unit in an appropriate manner to release each stopped article at the first zone of the conveyor to effect movement thereof to a particular storage path or line.

It is an object of my invention to provide in a control system of this kind an improved control mechanism in which the ultimate destination of articles can be predetermined before movement of successive articles is initiated from their stop positions at the first zone.

Another object of my invention is to provide such a control system in which a plurality of articles on the article receiving conveyor can be dispatched in rapid succession to their ultimate destinations.

Another object of my invention is to provide a control system in which each successive article on the article receiving conveyor, when the article has been stopped at the first zone, can be dispatched automatically to its ultimate destination after movement of the preceding article has been initiated from the first zone.

A still further object of the invention is to provide such an improved control mechanism having each article represented by a freely moving member, such as a ball, for example, the balls being moved in paths of movement defining closed circuits which include programming or memory channels and in which the position of each ball in one of the memory channels determines the ultimate destination of the article represented by the ball. I accomplish this by providing such an improved control mechanism which includes a movable part driven in synchronism with the article receiving conveyor, utilizing the driven movable part to move the balls through parts of the closed circuits in synchronism with the articles on the conveyor, controlling the manner in which the balls are introduced into and pass through the programming or memory channels, rendering devices on the article receiving conveyor operable responsive to the positions of the balls in the closed circuits in which they are movable, and effecting movement of successive articles to their ultimate destinations responsive to operation of the devices.

Further objects and advantages of my invention will become apparent as the following description proceeds, and the features of novelty which characterize my invention will be pointed out with particularity in the claims annexed to and forming a part of this specification.

Figure 1:
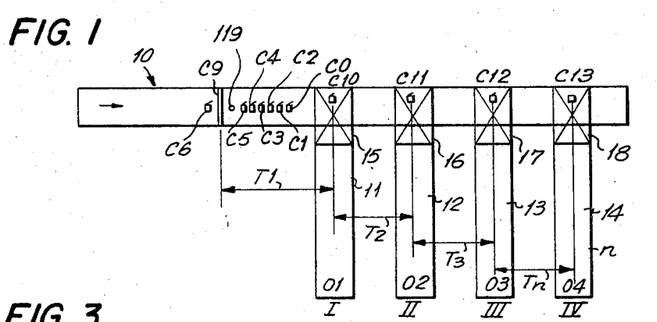
FIG. 1 is a top plan view diagrammatically illustrating a conveyor system with which my invention may be employed for sorting and storing articles.
Figure 2:
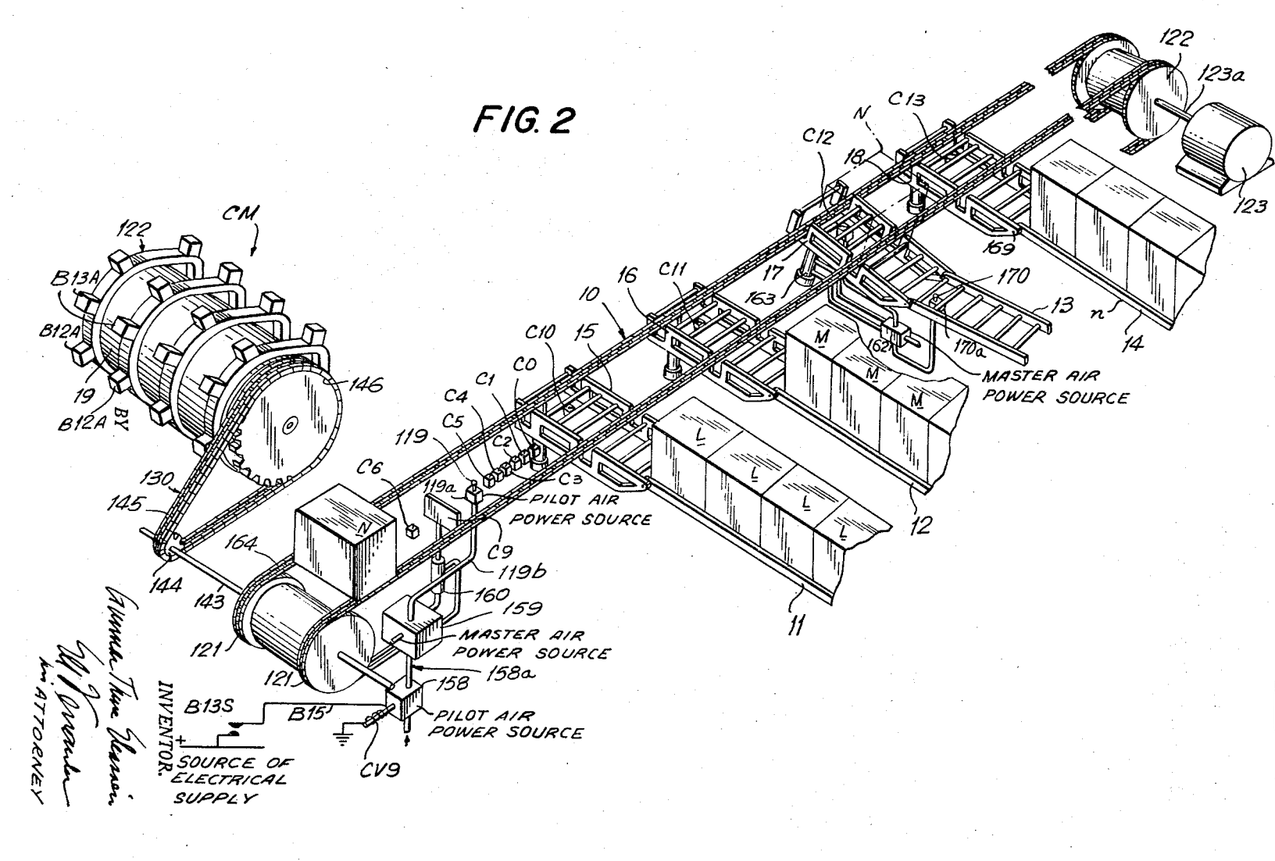
FIG. 2 is a fragmentary perspective view of a conveyor system like that diagrammatically shown in FIG. 1 and certain control features.

In FIGS. 1 and 2 I have diagrammatically illustrated a conveyor system which includes an endless article receiving conveyor 10 operating over end rollers 121 and 122 which may be driven by an electric motor 123 having a shaft 123a arranged to drive the end roller 122. Articles, such as boxes, pallets or the like, for example, which are positioned on the receiving conveyor 10 in any suitable manner, are selectively transferred therefrom by transfer or switching units 15, 16, 17 and 18 to storage paths or lines 11, 12, 13 and 14, respectfully. When a variety of articles are positioned on the article receiving conveyor 10, for example, the switching units 15, 16, 17 and 18 may be operated to transfer to each of the storage paths 11, 12, 13 and 14 articles which are of the same kind or generally similar to one another. Any number of storage paths, which are transverse to the receiving conveyor 10, may be provided, and in the embodiment illustrated four such paths are shown. Each article is automatically transferred from the article receiving conveyor to a selected storage path by a mechanical memory or control mechanism CM which embodies means for selectively determining in advance the manner in which a plurality of articles will be sorted and stored on the conveyor system.

The automatic transfer of articles from the receiving conveyor 10 to particular storage paths 11, 12, 13 and 14 is effected by the mechanical memory or control mechanism CM which includes a drum 19 driven in conjunction or synchronism with the receiving conveyor 10 and actuated through speed reduction mechanism 130 from a shaft 143 of end roller 121 of the receiving conveyor. The control mechanism CM exercises control over a stop $C_9$ which is supported in the manner shown in FIG. 2 and can be moved into and out of the path of movement of articles on the receiving conveyor 10 from the end roller 121 toward the opposite end roller 122, as will be explained hereinafter.

In FIG. 2 it will be seen that articles L are stored on the first storage path 11 nearest to the stop $C_9$ of the receiving conveyor 10 and articles M are stored on the second storage path 12 from the stop $C_9$. An article N on the receiving conveyor 10 is shown positioned in front of the stop $C_9$. When the control mechanism CM has been rendered operable in advance to shift the article N from the receiving conveyor 10 to the third storage path 13, as will be explained presently, the stop $C_9$ will be moved out of the path of movement of the article N adjacent thereto and allow the article to be transported on the conveyor 10 to a zone opposite the third storage path 13, at which time the transfer or switching unit 17 at such zone will become operable to raise the article from the conveyor 10. From its raised position indicated by dotted lines in FIG. 2, the article moves by gravity onto the third storage path 13. As shown in FIG. 2, the storage paths 11, 12, 13 and 14 may slope downward from the receiving conveyor 10 to promote downward gravity movement of the articles thereon.

As seen in FIG. 2, the speed reduction mechanism 130 for actuating the control mechanism CM includes an endless chain 145 which travels over a small sprocket wheel 144 fixed to the shaft 143 of end roller 121 and a larger sprocket wheel 146 which drives the drum 19. Hence, the speed reduction mechanism 130 drives the drum 19 of the mechanical memory or control mechanism CM at a speed which is less than that at which the receiving conveyor 10 is driven. The control mechanism CM includes structure 122 providing a plurality of passageways 22 which are normal to the axis of the drum 19 and extend about the periphery thereof for the points A to the points B. The number of passageways 22 provided may correspond to the number of storage paths 11, 12, 13 and 14 in the system, which, in the embodiment being described, is four. For reasons that will be given hereinafter, the number of passageways 22 may be one less than the total number of storage paths embodied in the conveyor system. Three sides of the passageways 22 are defined by the structure 122 and the fourth or inner sides of the passageways are defined by the outer surface of the drum 19.

Figure 5:
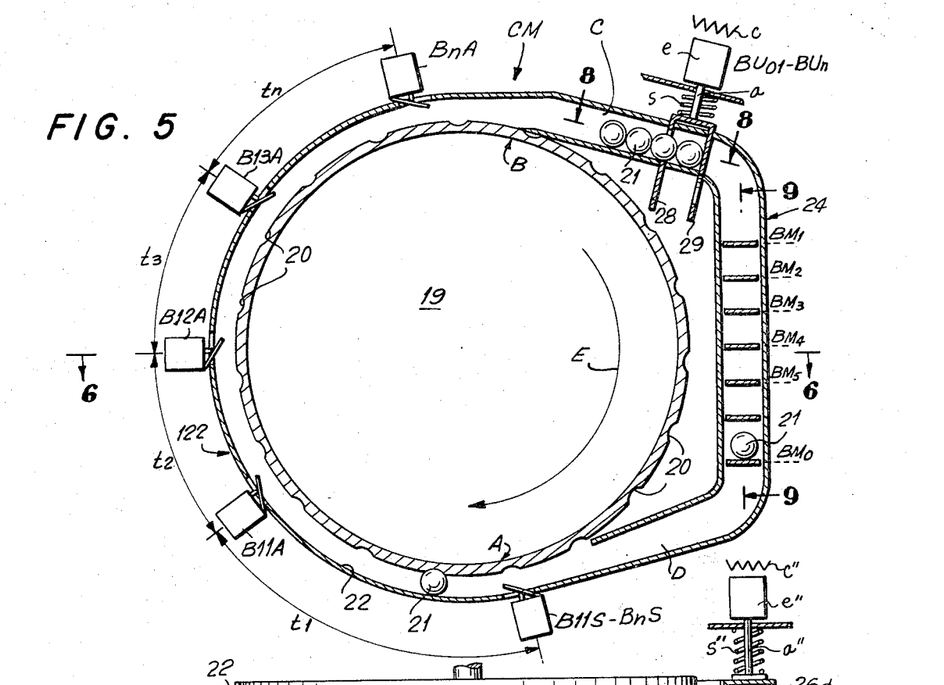
FIG. 5 is a vertical sectional view of control mechanism embodying my invention for selectively determining in advance the manner in which a plurality of articles will be sorted and stored on the conveyor system.
Figure 6:
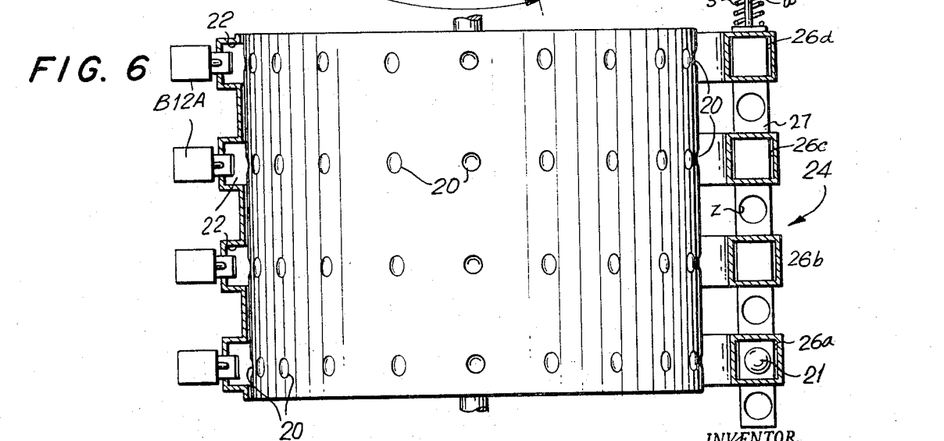
FIG. 6 is a fragmentary side elevation of a part of the control mechanism shown in FIG. 5.

The passageways 22 form portions or parts of paths of movement defining closed circuits through which members, such as balls 21, for example, are freely movable while in physical contact with the drum 19. As seen in FIG. 5, each path of movement includes the part of passageway 22, an elongated hollow member C which slopes downward from the upper end B of the passageway, an elongated hollow member D which slopes upward from the lower end A of the passageway, and a portion 24 which may be referred to as a memory component and extends vertically between the hollow members C and D and is in communication therewith and functions to program and determine in advance the manner in which a plurality of articles will be sorted and stored on the conveyor system.

The drum 19, at the regions of the passageways 22, is formed with a plurality of rows of openings or recesses 20 at its outer surface which are normal to the axis of the drum. Each row of openings or recesses 20 is provided at a different one of the passageways 22. When a ball 21 moves downward by gravity through a hollow elongated member D, it is guided into the lower end or point A of a passageway 22. Since the drum 19 is being rotated in the direction of the arrow E in FIG. 5, the ball 21 will move into one of the openings or recesses 20 and be propelled upward through the passageway 22 from the point A to the point B. At the point B the ball 21 passes from the passageway 22 into the hollow elongated member C in which it moves downward by gravity.

Four electrical switches $B_{11}S$, $B_{11}A$, $B_{12}A$ and $B_{13}A$ are provided for each of the passageways 22. The switches, which are mounted in any suitable manner on the structure 122 providing the passageways, are normally open and arranged to be actuated and closed when contacted by one of the balls 21. Hence, a particular ball moving upward through the passageway 22 in FIG. 5 will first actuate switches $B_{11}S$ and thereafter actuate switches $B_{11}A$, $B_{12}A$ and $B_{13}A$. The time $t_1$ it takes for a ball 21 to be propelled upward by the drum 19 from the switch $B_{11}S$ to the switch $B_{11}A$ corresponds to the time $T_1$ it takes for an article to move on the receiving conveyor 10 from the stop $C_9$ to the switching unit 15 opposite the first storage path 11; the time $t_1+t_2$ that takes for a ball 21 to be propelled upward by the drum 19 from the switch $B_{11}S$ to the switch $B_{12}A$ corresponds to the time $T_1+T_2$ it takes for an article to move on the receiving conveyor 10 from the stop $C_9$ to the switching unit 16 opposite the second storage path 12; and the time $t_1+t_2+t_3$ that it takes for a ball to be propelled upward from the switch $B_{11}S$ to the switch $B_{13}A$ corresponds to the time $T_1+T_2+T_3$ it takes for an article to move on the receiving conveyor 10 from the stop $C_9$ to the switching unit 17 opposite the third storage path 13.

Figure 3:
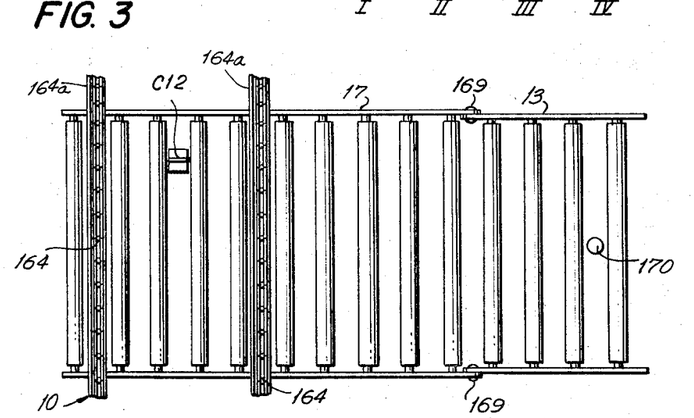
FIG. 3 is a top plan view of parts illustrated in FIG. 2.

In FIGS. 2 and 3, I have shown parts of electrical circuits in which the switches $B_{13}S$ and $B_{13}A$ for the third storage path 13 are connected. It should be understood that the electrical circuits in which similar switches for the other storage paths 11 and 12 are connected are the same as those for the switches now to be described. When the switch $B_{13}S$ in the passageway 22, which governs the transfer of articles from the receiving conveyor 10 to the third storage path 13, is actuated and closed by a ball 21, an electrical circuit is completed from a source of electrical energy through switch $B_{13}S$ for the third passageway 22, conductor $B_{15}$ and solenoid operated pilot control valve $CV_9$ to ground. The solenoid operated pilot control valve $CV_9$ forms a part of a pilot control system 158a for controlling flow of compressed air from a pilot air source to a master control valve 159 which is arranged to supply compressed air from a master air power source either to the space above or below the piston in air cylinder 160. When energized, the solenoid operated pilot control valve $CV_9$ functions to effect downward movement of the piston in cylinder 160 to which is connected the stop $C_9$, whereby stop $C_9$ will be moved to a position out of the path of movement on the receiving conveyor 10.

Figure 4:
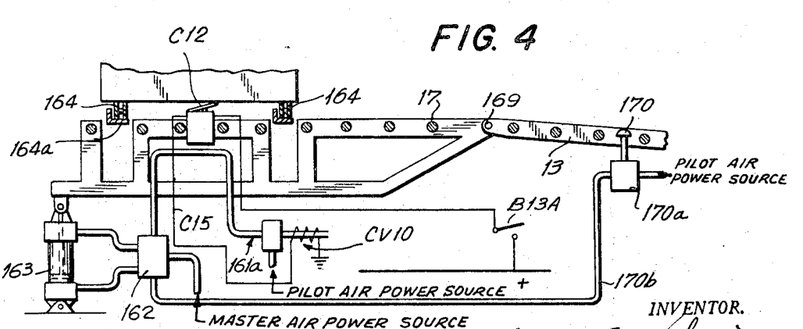
FIG. 4 diagrammatically illustrates parts shown in FIG. 3 and additional control features.

In FIG. 4, I have shown an electrical circuit in which the switches $B_{13}A$ and $C_{12}$ for the third storage path are connected. It should be understood that the electrical circuits in which similar switches for the other storage paths 11 and 12 are connected are the same as for the switches $B_{13}A$ and $C_{12}$ now to be described. When the switch $B_{13}A$ is actuated and closed by the ball 21 and an article at the switch device 17 opposite the third storage path 13 actuates and closes the switch $C_{12}$, an electrical circuit will be completed from a source of electrical energy through switch $B_{13}A$, switch $C_{12}$, conductor $C_{15}$ and solenoid operated pilot valve $CV_{10}$ to ground. The solenoid operated valve $CV_{10}$ forms a part of a pilot air control system 161a, as shown in FIG. 4, for controlling flow of compressed air from a pilot air source to a master control valve 162 which is arranged to supply air from a master air power source either to the space or below the piston in air cylinder 163. Under the conditions just described, the solenoid operated valve $CV_{10}$ functions to effect upward movement of the piston in cylinder 163 which is connected to the transfer or switching unit 17 for the third storage path 13, whereby the switching unit 17 will be moved to its raised position about the pivotal connections 169.

Referring to FIGS. 2, 3 and 4, it will be seen that the storage paths 11, 12 and 13 comprise suitable frame structure having stationary rollers in spaced relation. The receiving conveyor 10 comprises pairs of spaced apart endless chains 164. The end rollers for the chain conveyor comprises spaced sprocket wheels, one pair of which is shown at 121 in FIG. 2. The portions of the endless chains 164 traveling from left to right in FIG. 2 ride in elongated members 164a and extend vertically above such members, as best seen in FIG. 4.

At the article receiving end of the third storage path 13 is provided a button 170 which is acted upon by an article transferred to the storage path 13 and may be referred to as pneumatic control member. The button 170 forms a part of a button operated pilot control valve 170a connected in a pilot air control system 170b for controlling flow of compressed air from a pilot air source to a master control valve 162. When the button operated pilot control valve 170a is acted upon by the article, the pilot air control system 170b becomes operable to cause the master air control valve to function and effect downward movement of the piston in cylinder 163, thereby lowering the switch unit 17 to its position illustrated in FIG. 4.

When the article N on the receiving conveyor 10 is to be delivered to the third storage path 13, for example, it advances to the stop $C_9$ which is in its raised or upper position, as shown in FIG. 2. The receiving conveyor 10 and drum 19 of the control mechanism CM are driven continuously. Hence, when the article N moves against the stop $C_9$ and is prevented from traveling on the conveyor, it will slide on the endless chains 164 of the receiving conveyor 10.

When the switch $B_{13}S$ in the third passageway 22 about the drum 19 is actuated and closed by a ball 21, an electrical circuit will be completed for the solenoid operated pilot control valve $CV_9$ in the manner explained above and the latter functions to cause the stop $C_9$ to move downward out of the path of movement of the article N. Immediately after the article N travels past the stop $C_9$, it acts upon a button 119 which may be referred to as a pneumatic control member. The button 119 forms a part of a button operated pilot control valve 119a connected in a pilot air control system 119b, as shown in FIG. 2, for controlling flow of compressed air from a pilot air source to the master control valve 159. When the button operated pilot control valve 119a is acted upon by the article N, the pilot air control system 119b becomes operable to cause the master control valve 159 to function and effect upward movement of the piston in cylinder 160, thereby raising the stop $C_9$ to the position illustrated in FIG. 2.

It has been stated above that the number of passageways 22 embodied in the control mechanism CM may correspond to the number of storage paths 11, 12, 13 and 14 in the conveyor system. In order that the preferred embodiment disclosed will be applicable to all conveyor systems irrespective of the number of storage paths or lines in the system, we can assume that there are $n$ storage paths in the conveyor system in which the present invention is embodied. Hence, the time it will take for an article to travel on the receiving conveyor from the stop $C_9$ to the last storage path 14, which can also be designated path $n$, will be $T_1+T_2+T_3+Tn$, as indicated in FIG. 1. In other figures in the drawing, it will be understood that the suffix $n$ for any reference character indicates that reference is being made to a part associated with the last storage path or line $n$.

After articles on the receiving conveyor 10 pass all of the storage paths in the conveyor system except the last one, it will be obvious that it will not be necessary to predetermine in advance that such articles should be transferred automatically to the last storage path $n$. In such event, the articles can be transferred from the receiving conveyor to the last storage path by manually operable mechanism, as will be explained hereinafter. In FIG. 1, the storage paths 11, 12, 13 and 14 are designated I, II, III and IV, respectively. Storage path IV, which is the last $n$th storage path, is provided with a transfer or switching unit 18 which is like the switching unit 17 shown in FIG. 4 and described above. However, the switch $C_{13}$ for the switching unit 18 may be manually controlled for the reason given above.

Figure 7:
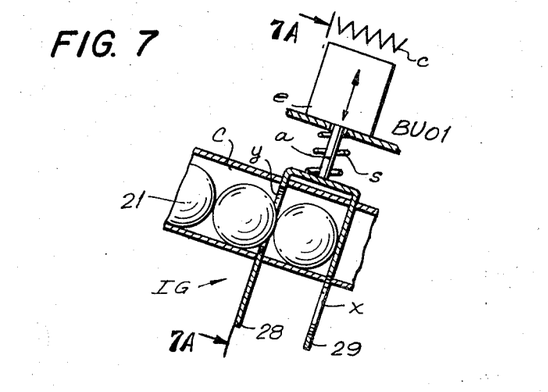
FIG. 7 is an enlarged fragmentary sectional view of parts of the control mechanism shown in FIG. 2.

As explained above, each passageway 22 of the control mechanism CM forms a part of a path of movement for the balls 21 which also includes the downward sloping hollow member C. The elongated hollow members C may be referred to as collecting channels in which the balls 21 collect after being raised from the points A to the points B in the passageways 22. The balls 21 move downward by gravity in the collecting channels C and are held therein by individual gates IG comprising U-shaped members having closed ends and tongues or arms 28 and 29 extending therefrom. The arms 28 and 29 extend through slots formed in the hollow members C and are movable in planes perpendicular to the longitudinal axes of the hollow members. In FIG. 7, in which the lower end of one of the collecting channels is shown, it will be seen that the spaced arms 28 and 29 are biased toward the left by a spring $s$ disposed between the closed end of the gate IG and a shell $e$ of an electromagnet having a coil $c$. When the coil $c$ is energized an elongated element $a$, which is fixed to the closed end of the gate IG, is attracted toward the right against the biasing action of the spring $s$. The spring $s$ is disposed about the elongated element $a$ which serves as an armature element for the electromagnet. In FIG. 7 the electromagnet is designated $BU_{01}$.

Figure 7A:
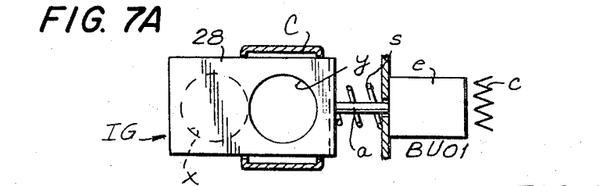
FIG. 7A is a view taken at line 7A—7A of FIG. 7.

In FIGS. 7 and 7A it will be seen that the top arm 28 is provided with an opening $y$ which is positioned in the channel C when the coil $c$ of the electromagnet is deenergized. The bottom arm 29 is provided with an opening $x$ which is laterally offset from the opening $y$ and positioned outside the channel C. Hence, when the arms 28 and 29 are in the positions illustrated in FIG. 7, a single ball 21 can pass through the opening $y$ into the vertical space between the top and bottom arms 28 and 29 of the individual gate IG.

When the coil $c$ of the electromagnet $BU_{01}$ is energized and the individual gate IG is attracted toward the right against the biasing action of the spring $s$, the opening $y$ moves out of the channel C and the opening $x$ moves into the channel C, thereby allowing the ball 21 held between the arms 28 and 29 to move downward from the channel C through the opening $x$ in the bottom arm 29. Hence, the individual gate IG functions to permit only a single ball to be discharged through the collecting channel C each time the coil $c$ of the electromagnet $BU_{01}$ is momentarily energized.

Figures 8, 12:
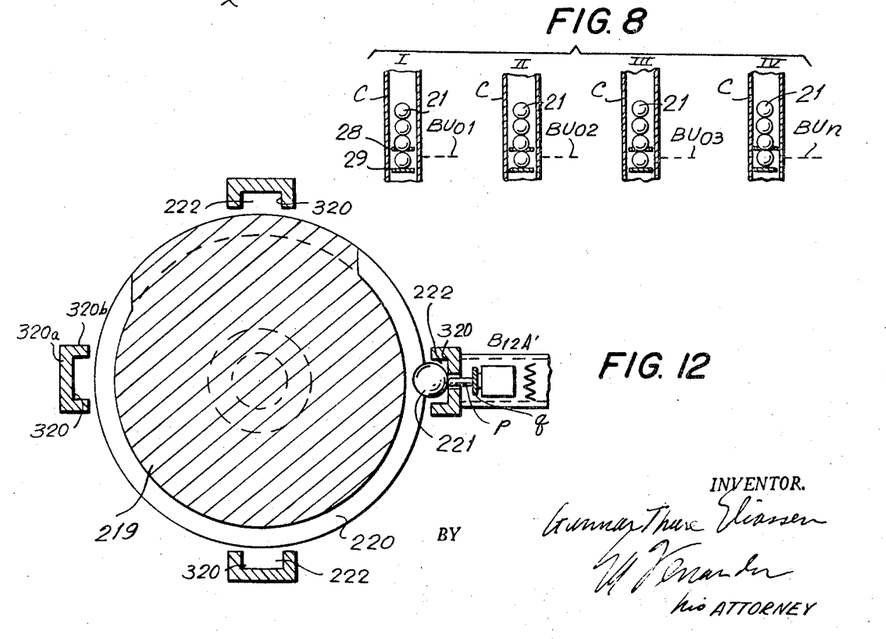
FIG. 8 is a fragmentary sectional view taken at line 8—8 of FIG. 5, diagrammatically illustrating the manner in which a number of parts like those shown in FIG. 7 are vertically disposed alongside one another.

It will be understood that the collecting channels C are normal or perpendicular to the drum 19 and are spaced from each other axially of the drum 19, as shown in FIG. 8. In FIG. 8 the electromagnets for the collecting channels representing storage paths I, II, and III are designated $BU_{01}$, $BU_{02}$ and $BU_{03}$, respectively; and the electromagnet for the collecting channels representing the storage path IV, the last storage path, is designated $BU_n$.

FIGS. 9A to 9D are fragmentary sectional views of the memory component 24 of the mechanical memory CM. The memory component 24 provides parts of the closed circuits for the balls 21 which extend vertically between the lower ends of the ball collecting channels C and the upper ends of the ball feeding channels D. The memory component 24 includes vertical channels 26a, 26b and 26c for the storage paths I, II and III, respectively which may be referred to as memory channels and function to program and determine in advance the manner in which a plurality of articles will be sorted and stored on the conveyor system.

As shown in FIGS. 9A–9D, each of which is taken at line 9—9 of FIG. 5, a single gate SG is provided for all of the storage paths for controlling the discharge of balls 21 from the memory channels 26a, 26b and 26c into the ball feeding channels D. The single gate SG comprises a U-shaped member having a closed end and a pair of arms 28' and 29' extending therefrom. The arms 28' and 29' extend through slots formed in the lower ends of the upright walls defining the memory channels 26a, 26b and 26c. In FIGS. 9A–9D it will be seen that the spaced arms 28' and 29' are biased toward the left by a spring $s'$ having one end thereof bearing against a flange $f$ fixed to the elongated element $a'$ and the opposite end thereof bearing against an apertured upright member $m$ through which the element $a'$ extends. The spring $s'$ is disposed about the element $a'$ which serves as an armature element for an electromagnet $BM_0$ having a coil $c'$. When the coil $c'$ is energized, the elongated element $a'$ is attracted toward the right against the biasing action of the spring $s'$.

The top and bottom arms 28' and 29' of the single gate SG for the memory channels 26a', 26b' and 26c' are provided with openings $x'$ and $y'$, respectively, which are laterally offset from one another. When the electromagnet $BM_0$ is deenergized and the single gate SG is biased toward the left by the spring $s'$, the openings $x'$ in the top arm 28' are positioned in the channels 26a, 26b and 26c, as shown in FIGS. 9A to 9D. Under these conditions, openings $y'$ in the bottom arm 29' are laterally offset from the openings 28' and positioned outside the memory channels 26a', 26b' and 26c'. When the electromagnet $BM_0$ is energized and the single gate SG moves towards the right against the biasing action of the spring $s'$, the openings $x'$ in the top arm 28' are positioned outside the memory chanenls 26a, 26b and 26c and the openings $y'$ in the bottom arm 29' are positioned within the memory channels 26a, 26b and 26c, as shown in FIG. 9C.

The memory components 24 of the mechanical memory or control mechanism CM also includes a plurality of horizontal arms or tongues 27 which are movable through slots formed in the upright walls defining the memory channels 26a, 26b and 26c. In FIGS. 9A to 9D the arms 27 are biased toward the left by springs $s''$ in the same manner that the single gate SG is biased to the left by the springs $s'$. The right-hand ends $a''$ of the arms 27 serve as armature elements of electromagnets having coils $c''$ which, when energized, move the arms 27 to the right against the biasing action of the springs $s''$. In FIGS. 9A to 9D the electromagnets for the arms 27 are designated $BM_1$, $BM_2$, $BM_3$, $BM_4$ and $BM_5$.

Figure 9A:
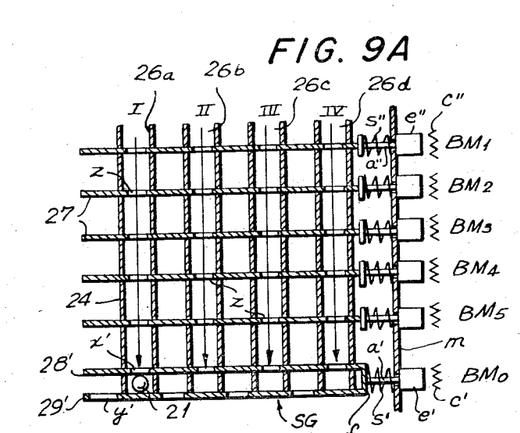
FIGS. 9A to 9D are fragmentary vertical sectional views, taken at line 9—9 of FIG. 5, illustrating different positions parts of the program mechanism can assume.
Figure 9B:
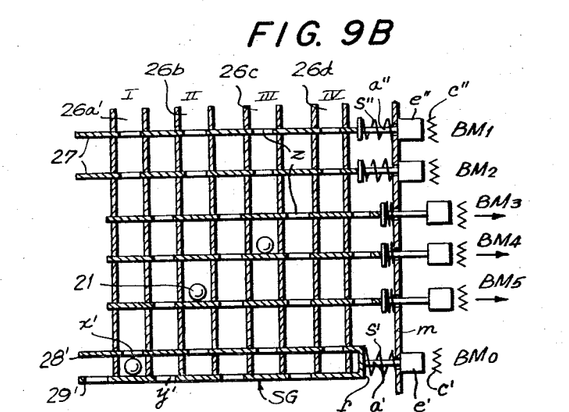
Figure 9C:
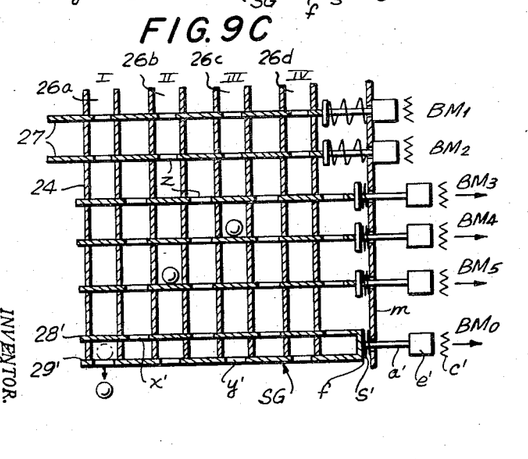
Figure 9D:
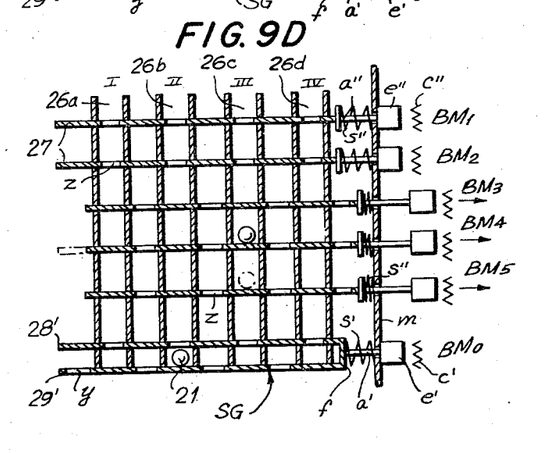

The arms 27 are provided with openings $z$ which are positioned in the vertical channels 26a, 26b and 26c when the electromagnets $BM_1$ to $BM_5$ are deenergized, as shown in FIG. 9A. When any one of the electromagnets $BM_1$ to $BM_5$ is energized, the arms 27 associated therewith are moved to the right and the openings $z$ are laterally offset from the memory channels 26a, 26b and 26c and positioned outside the memory channels, as seen in FIGS. 9B, 9C and 9D. The arms 27 and electromagnets $BM_1$ to $BM_5$ coact with the balls 21 discharged from the collecting channels C and cause the balls to assume different positions with respect to one another, as will be explained hereinafter.

Figure 10:
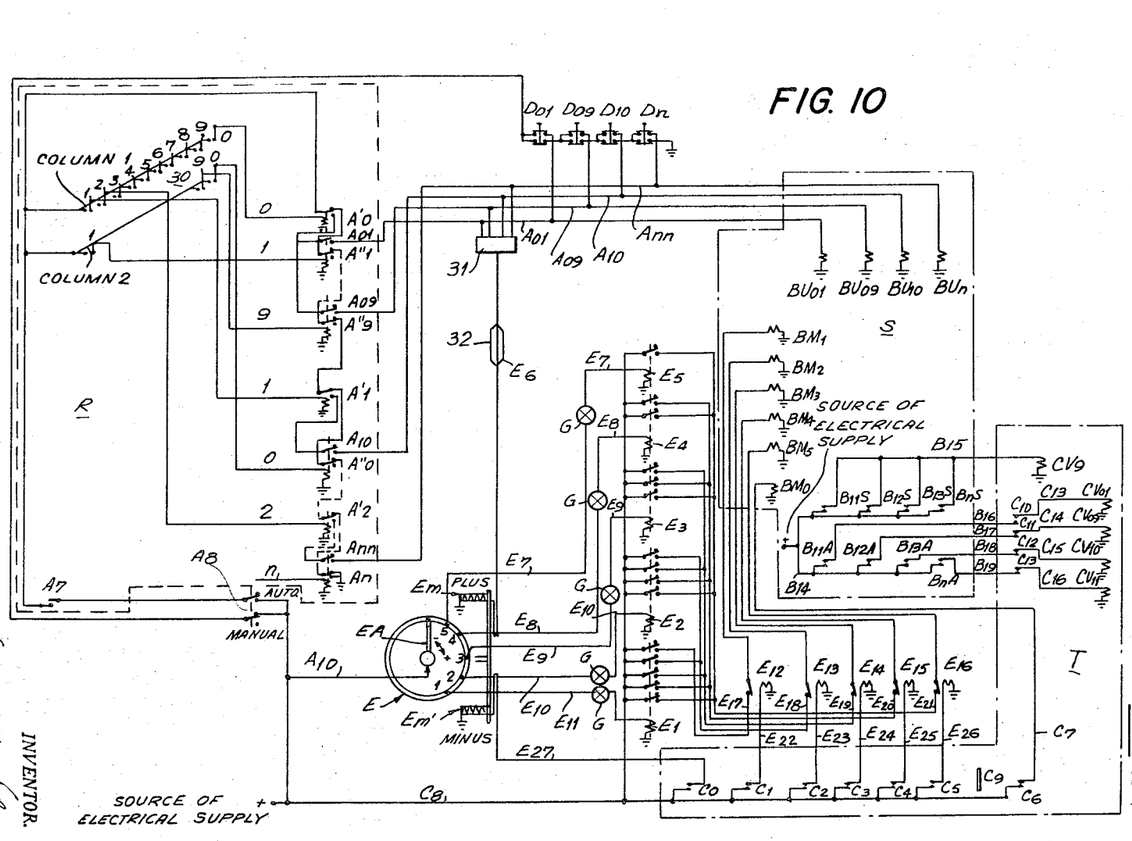
FIG. 10 is a view digrammatically illustrating the electrical connections for controlling the operation of a conveyor system like that shown in FIG. 1 with control mechanism like that shown in FIGS. 5 to 9D.
Figure 11:
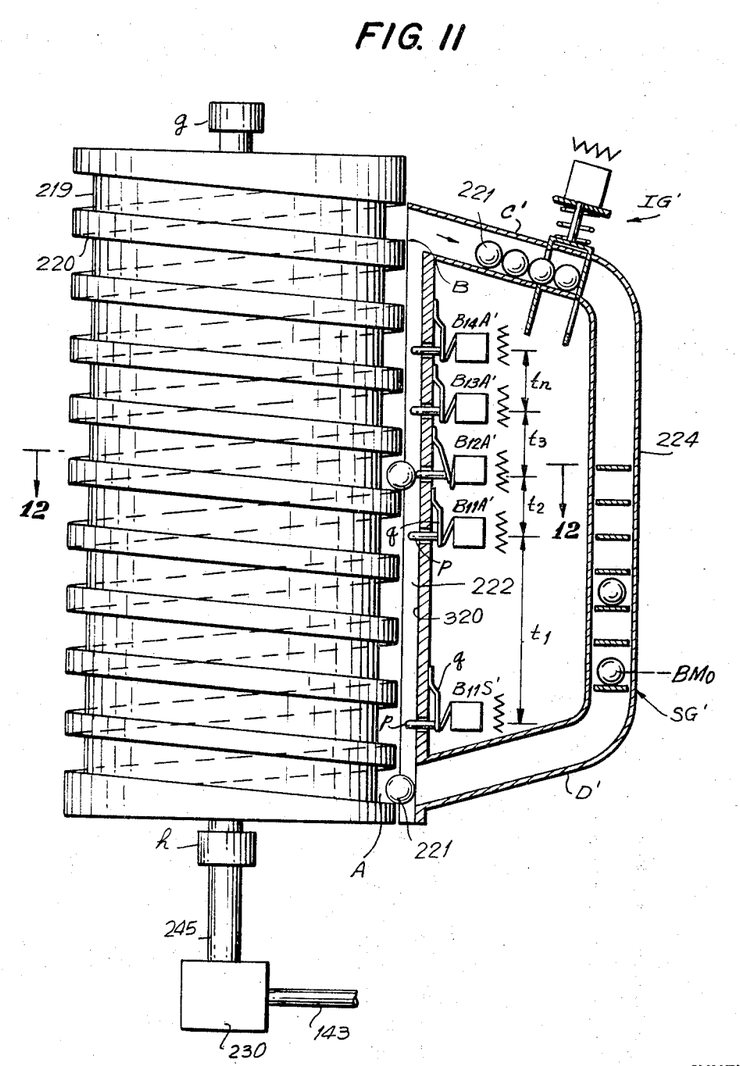

The electrical connections for the conveyor system described above and shown in FIGS. 1 to 9D are diagrammatically illustrated in FIG. 10. FIG. 10 includes areas R, S and T defined by dotted lines. The area R includes the electrical connections for a punched card reader or punched tape reader which functions to supply information to the memory component 24 of the mechanical memory or control mechanism CM to program and determine in advance the manner in which a plurality of articles will be sorted and stored on the conveyor system. The area S includes the electrical connections for the control mechanism CM. The area T includes the electrical components acted upon by the articles traveling on the article receiving conveyor 10. The electrical connections outside the areas R, S and T may be referred to as an operating center which interrelates the principal electrical components in the areas R, S and T.

The electrical connections in FIG. 10 include a switch $A_8$ which is movable between "AUTOMATIC" and "MANUAL" operating positions. When the switch $A_8$ is moved to its "MANUAL" position, balls 21 may be introduced manually from the collecting channels C into the memory component 24 of the control mechanism CM by manually operating push buttons $D_{01}$, $D_{09}$, $D_{10}$ and $D_n$ to program and predetermine in advance the manner in which a plurality of articles will be sorted and stored on the conveyor system. This information also may be supplied to the memory component 24 of the control mechanism CM by moving the switch $A_8$ to its automatic position and introducing the balls 21 from the collecting channels C into the channels 26a, 26b and 26c with the aid of a sensing device 30 which is connected to a plurality of relays $A'$ and $A''$ and to which are fed punched cards or punched tape, as will be described presently. Further, a contact $A_7$ is provided which functions responsive to a hole in a punched card when the latter is positioned for the hole to respond to such a sensing operation.

The electrical components illustrated in FIG. 10 which are especially related to supply information to the control mechanism CM to program and determine in advance the manner in which a plurality of articles will be sorted and stored on the conveyor system include the electromagnets $BU_{01}$ to $BU_n$ for controlling the discharge of balls 21 from the lower ends of the discharge channels C; the electromagnets $BM_1$ to $BM_5$ for controlling the relative positions of the balls 21 in the upright memory channels 26a, 26b, and 26c; the electromagnet $BM_0$ for controlling the discharge of the balls 21 from the lower ends of the memory channels to the feeding channels D; the switches $B_{11}S$ to $B_nS$ for controlling the stop $C_9$; and the switches $B_{11}a$ to $B_nA$ in the passageways 22 which are actuated and closed by the balls 21 propelled past the switches.

The area T in FIG. 10 includes the solenoid operated pilot air control valve $CV_9$ which functions to render the stop $C_9$ on the receiving conveyor 10 inoperable to hold back an article on the conveyor and to release the article when one of the switches $B_{11}S$ to $B_nS$ is actuated by a ball 21 which is at point A in one of the passageways 22 and about to be propelled upward toward a point B in the passageway. The area T also includes the electrical switches $C_{10}$ to $C_{13}$ at the switch transfer units 15 to 18, respectively; the solenoid operated pilot air control valves $CV_{01}$ to $CV_n$ associated with the switches $B_{11}A$ to $B_nA$ of the control mechanism CM for controlling the transfer or switching units 15 to 18, respectively; and a switch $C_6$ located at the rear of the stop $C_9$ and a plurality of switches $C_0$ to $C_5$ located in front of the stop $C_9$ which are acted upon by articles leaving the receiving conveyor 10 and the function of which will be described presently.

FIG. 10 also diagrammatically illustrates a selector E having an angularly movable contact arm EA adapted to be angularly moved in stepwise fashion from one contact to the next succeeding contact. The contacts, which are designated 1 to 5 respectively, are arranged on the selector E in such manner that two adjacent contacts momentarily are energized from the source of electrical energy when the contact arm EA is moved a single step. The selector E, which is of a well known type, is guided by mechanism which includes a pair of electromagnets $E_m$ and $E_m'$ one of which is designated "PLUS" and the other "MINUS," as seen in FIG. 10. To the contacts 1 to 5 of the selector E are connected a plurality of indicating lamps G and a plurality of relays $E_1$ to $E_5$ which function in a manner to be described presently.

The operation of the conveyor system described above and illustrated in the drawing is substantially as follows: It will be assumed that it is desired to transfer a plurality of articles from the article receiving conveyor 10 to the storage paths of lines I, II and III. It also will be assumed that balls 21 are collected in the collecting channels C, as shown in FIG. 8; and no balls are positioned in the upright memory channels 26a, 26b and 26c of the memory components 24 of the mechanical memory or control mechanism CM, as shown in FIG. 9A. Under these conditions, a ball discharged from any one of the collecting channels C operatively associated with one of the storage paths I, II and III will fall by gravity to the lower end of one of the upright memory channels 26a, 26b or 26c.

If it is desired to transfer an article automatically from the conveyor 10 to the storage path I and to program and predetermine such transfer in advance, a punched card is required that is punched with the numerals 01, the numeral "0" being in a first position on the card which may be referred to as a "COLUMN 1" position and the numeral "1" being in a second position on the card which may be referred to as a "COLUMN 2" position. When the sensing device 30 receives a punched card of the kind just described, the device 30 becomes operable to complete a circuit for the coil of relay $A'_0$ which, when energized, closes the contacts of this relay. The sensing device 30 also becomes operable to complete a circuit for the relay $A''_1$ which, when energized, closes the contacts of this relay. When the contacts of relays $A'_0$ and $A''_1$ close, a circuit is completed from the source of electrical supply through the two relays, conductor $A_{01}$ and electromagnet $BU_{01}$ to ground.

In the event it is desired to effect manual storing of the article on the storage path I, the switch $A_8$ is moved to its "MANUAL" position and the push button $D_{01}$ is operated manually, whereby conductor $A_{01}$ is momentarily connected to the source of electrical supply and a circuit will be completed for electromagnet $BU_{01}$.

In the event it is desired to transfer an article automatically from the receiving conveyor 10 to a storage path or line X, for example, and to program and determine such transfer in advance, a punched card is required punched with the numerals 10, the numeral "1" being in a first position on the card located at "COLUMN 1" and the numeral "0" being in a second position on the card located at "COLUMN 2." When the sensing device 30 receives a punched card of this kind, the device 30 becomes operable to complete circuits for the coils of relays $A'_1$ and $A''_0$ and, through the contacts of these relays, complete a circuit from the source of electric supply which includes conductor $A_{10}$ and electromagnet $BU_{10}$ to ground.

When electromagnet $BU_{01}$ becomes energized in the manner explained above, a single ball 21 is discharged from the lower end of the discharge channel C operatively associated with storage path or line I in the manner explained above. Since all of the electromagnets $BM_1$ to $BM_5$ are deenergized, all of the arms 27 are biased toward the left and the openings z are positioned within the upright memory channel 26a and will allow the ball released from the lower end of the channel C for storage path I to fall to the bottom of the channel into the space between the top and bottom arms 28' and 29' of the single gate SG as shown in FIG. 9A.

When a circuit for electromagnet $BU_{01}$ is completed, a circuit is also completed for the stepping selector E. This circuit for energizing selector E is completed from conductor $A_{01}$ through a decoupling device 31, a delaying device 32 and electromagnet $E_m$ to ground, thereby effecting movement of contact arm EA by a single step to contact 5. This completes a circuit from the source of electrical supply through conductor $E_7$ and the coil of relay $E_5$ to ground. When the relay $E_5$ is energized, the contacts 5 thereof will close to complete an electrical circuit through conductor $E_{21}$, normally closed contacts of relay $E_{16}$ and coil of electromagnet $BM_5$ to ground. This renders electromagnet $BM_5$ operable to move the arm 27 associated therewith to the right and shift the openings z therein out of the upright memory channels 26a, 26b and 26c. Hence, imperforate portions of the arm or tongue 27 associated with the electromagnet $BM_5$ will be positioned within the upright memory channels 26a, 26b and 26c and stop downward movement of balls toward the single gate SG in all of the memory channels.

In addition to the ball 21 delivered to the upright memory channel 26a associated with storage path or line I, as just explained, other punched cards may be employed in the sensing device 30 to energize the appropriate electromagnets $BU_{02}$ and $BU_{03}$ at the lower ends of the collecting channels C associated with the storage paths II and III, respectively, to release balls to the upright memory channels 26b and 26c, as illustrated in FIG. 9B. FIG. 9B illustrates three balls in the memory channels 26a, 26b and 26c which function to program and determine in advance the manner in which three articles on the receiving conveyor 10 will be sorted and stored on the storage paths or lines I, II or III. In FIG. 9B it will be seen that electromagnets $BM_3$, $BM_4$ and $BM_5$ are energized, the arm 27 associated with the electromagnet $BM_5$ functioning to supply the ball 21 in memory channel 26b associated with the storage path II, the arm 27 associated with the electromagnet $BM_4$ functioning to supply the ball 21 in memory channel 26c associated with storage path III, and the arm associated with the electromagnet $BM_3$ functioning to stop downward movement of balls in all of the memory channels to the arm 27 above the arm upon which the ball 21 rests in the memory channel 26c associated with storage path III.

It will be understood that the relative positions of the balls in the memory channels 26a, 26b and 26c can vary in many different ways. The number of electromagnets $B_m$ employed determines the number of arms 27 which are arranged one above another in the memory channels 26a, 26b and 26c and hence the number of articles whose ultimate destinations can be programmed and determined in advance by the manner in which the balls are positioned in the memory channels.

When the electromagnets $BM_3$, $BM_4$ and $BM_5$ are energized, as illustrated in FIG. 9B, the arm EA of the stepping selector E will have been moved to the contact 3. Under these conditions the coil of the relay $E_3$ will be energized and its contacts 3, 4 and 5 will be closed to complete circuits for the electromagnets $BM_3$, $BM_4$ and $BM_5$. It will be seen that successive relays $E_5$, $E_4$, $E_3$, $E_2$ and $E_1$ are provided with successively greater numbers of pairs of contacts. For example, the relay $E_5$ is provided with a single pair of contacts 5; the relay $E_4$ is provided with two pairs of contacts 4 and 5; the relay $E_3$ is provided with three pairs of contacts 3, 4 and 5; the relay $E_2$ is provided with four pairs of contacts 2, 3, 4 and 5; and the relay $E_1$ is provided with five pairs of contacts 1, 2, 3, 4 and 5. Hence, each of the relays $E_4$ to $E_1$ includes pairs of contacts provided for the relay that functions ahead of it and hence only those electromagnets $BM_1$ to $BM_5$ are energized at any given time which are essential for the proper operation of the control mechanism CM.

When the article to be transferred to the storage path I engages the stop $C_9$ on the receiving conveyor 10, it acts on the switch $C_6$. When this occurs, a circuit is completed from the source of electrical circuit through switch $C_6$, conductor $C_7$ and electromagnet $BM_0$ to ground, as shown in FIG. 10. This effects movement of the single gate SG toward the right, as shown in FIG. 9C, whereby the opening $x'$ in the lower arm 29' thereof moves into the memory channel 26a and releases the ball 21 from the bottom of the memory channel into the feeding channel D for storage path I. The released ball moves by gravity through channel D to the lower point A of the passageway 22 for storage path 11 which has also been referred to as path I, as indicated in FIG. 5.

Since the drum 19 is being driven continuously, the ball will seat or nest in the first opening or recess 20 that the ball meets. This occurs practically at the same time that the ball engages the switch $B_{11}S$. This completes a circuit from the source of electrical supply through switch $B_{11}S$, conductor $B_{15}$ and coil of solenoid operated pilot air control valve $CV_9$ to ground, as shown in FIGS. 2 and 10. This causes the stop $C_9$ to move downward and out of the path of movement of the article on the conveyor, thereby releasing the article and permitting it to travel on the receiving conveyor 10. After the article clears the stop $C_9$, it engages the pneumatic control member or control button 119. This causes the pneumatic cylinder 160 to raise the stop $C_9$ to hold back the next succeeding article on the receiving conveyor 10.

The stop $C_9$ may be referred to as a "synchronizing stop" which functions to release an article on the conveyor 10 when the ball in the passageway 22 actuates and closes the switch $B_{11}S$. Hence, the article starts moving from the stop $C_9$ toward the first storage path or line 11 at the same moment that the drum 19 commences to move the ball upward from the switch $B_{11}S$, which is at the point A, to the switch $B_{11}A$. Accordingly, the moment when the ball 21 starts moving from the point A to the switch $B_{11}A$ of the passageway 22 and the article starts moving from the stop $C_9$ to the first transfer or switching unit 15 are synchronized at the stop $C_9$.

After the article is released at the stop $C_9$ and no longer acts on the switch $C_6$, the latter opens the circuit to the electromagnet $BM_0$ and the single gate SG moves toward the left responsive to the biasing action of the spring $s'$ thereon. When this occurs, the single gate SG is in the position shown in FIG. 9D.

After passing the pneumatic control member or button 119, the article engages and closes the switch $C_5$, as shown in FIG. 1. Referring now to FIG. 10, it will be seen that when switch $C_5$ closes, a circuit will be completed from the source of electrical supply through switch $C_5$, conductor $E_{16}$ and coil of relay $E_{16}$ to ground. When relay $E_{16}$ is energized, the contacts of this relay separate to open the circuit of the electromagnet $BM_5$. This permits the arm 27 associated with the electromagnet $BM_5$ to be moved toward the left responsive to the biasing action of the spring $s''$ acting thereon. When this occurs, a part of the arm 27 having an opening z moves into the memory channel 26b and allows the ball in this channel to move into the vertical space between the top and bottom arms 28' and 29' of the single gate SG, as shown in FIG. 9D.

When the article moves past the switch $C_5$, the circuit of the coil of relay $E_{16}$ opens and permits the contacts of this relay to return to their normally closed position. This action completes the circuit for the electromagnet $BM_5$, whereby the arm associated with this electromagnet moves to the right against the biasing action of the spring $s''$ acting thereon.

The article traveling on the receiving conveyor 10 passes from the switch $C_5$ to the switch $C_4$ and closes the latter to complete an electrical circuit from the source of electrical supply through switch $C_4$, conductor $E_{25}$ and coil of relay $E_{15}$ to ground. When relay $E_{15}$ is energized, the contacts of this relay separate to open the circuit of the electromagnet $BM_4$. This permits the arm 27 associated with the electromagnet $BM_4$ to be moved toward the left responsive to the biasing action of the spring $s''$ acting thereon. When this occurs, a part of the arm 27 having an opening z moves into the memory channel 26c and allows the ball in this channel to fall down one step and stop on the arm 27 associated with the electromagnet $BM_5$, as illustrated in FIG. 9D by the solid and dotted line positions of the ball in channel 26c.

The article traveling on the receiving conveyor 10 now successively acts upon and closes the switches $C_3$, $C_2$ and $C_1$. This in turn successively energizes the electromagnets $BM_3$, $BM_2$ and $BM_1$. In the particular operation being described, these electromagnets cannot affect any balls in the memory channels 26a, 26b and 26c. When the article engages and closes the switch $C_0$, however, a circuit is completed from the source of electrical supply through switch $C_0$, conductor $E_{27}$ and electromagnet $E_{m'}$ to ground. The electromagnet $E_{m'}$, which is referred to as the minus electromagnet of the stepping relay E, causes the arm EA of the stepping relay to move backward one step from the contact 3 to the contact 4. This disconnects the conductor $E_9$ from the source of electrical supply and deenergizes the coil of relay $E_3$ which in turn opens the circuit for the electromagnet $BM_3$. When the contact arm EA moves backward to the contact 4, a circuit is still completed from the source of electrical supply through conductor $E_8$ to the coil of relay $E_4$. Under these conditions, the pairs of contacts 4 and 5 of relay $E_4$ are closed to complete the circuits for the electromagnets $BM_4$ and $BM_5$, as explained above.

In view of the foregoing, it will now be understood that the number of balls 21 in the memory channels 26a, 26b and 26c has been reduced by one. Each time an article on the receiving conveyor 10 travels forward from the stop $C_9$, a ball 21 has moved from the lower end of the memory channels 26a, 26b and 26c through the single gate SG. Each ball 21 in the memory channels 26a, 26b and 26c, by virtue of its position in the channels, inherently possesses that information which will determine the ultimate destination of a particular article on the receiving conveyor 10.

The ball 21 discharged from the memory channel 26a in the manner explained above is propelled upward by the drum 19 from the point A to the switch $B_{11}A$ of a passageway 22, as shown in FIG. 5. The time $t_1$ it takes for the ball 21 to move from the switch $B_{11}S$ to the switch $B_{11}A$ is the same as the time $T_1$ it takes for an article to travel from the stop $C_9$ to the transfer or switching unit 15 for the storage path I. Accordingly, the ball 21 actuates the switch $B_{11}A$ at the same time that the switch $C_{10}$ at switching unit 15 is actuated by the article traveling on the conveyor 10. This completes an electric circuit from the source of electrical supply through switch $B_{11}A$, conductor $B_{16}$, switch $C_{10}$, conductor $C_{13}$ and coil of solenoid operated pilot air control valve $CV_{01}$ to ground.

When the circuit for valve $CV_{01}$ is completed, the transfer or switching unit 15 is raised by a pneumatically operated cylinder like the cylinder 163 in FIG. 4, whereby the article will move by gravity onto the storage path I in the same manner that the cylinder 163 in FIG. 4 raises the transfer or switching unit 17 to transfer an article therefrom, as explained above. When the article transferred onto the storage path I engages a pneumatic control member like the member 170 in FIG. 4, the cylinder will become operable to lower the switching unit 15 in the same manner that the switching unit 17 is lowered in FIG. 4, as explained above.

After the stop $C_9$ has been raised so that it will again be in the path of movement of articles traveling on the receiving conveyor 10, another article can be positioned on the conveyor to be moved thereon toward the stop $C_9$. When each article reaches the stop $C_9$, the switch $C_6$ is closed to complete a circuit for electromagnet $BM_0$ which, when energized, moves the single gate SG toward the right against the biasing action of the spring $s'$ and releases a ball 21 from one of the memory channels 26a, 26b and 26c. The control mechanism CM then functions to deliver each article to its ultimate destination.

After an article has been transferred from the receiving conveyor 10 to one of the storage paths or lines I, II or III, the next succeeding article on the conveyor can then be dispatched to its ultimate destination which has been programmed and determined in advance. Hence, the minimum length of time for dispatching successive articles to their ultimate destinations is equal to the time it takes for an article to travel from the stop $C_9$ to a particular transfer or switching unit and permit the switching unit to transfer the article from the conveyor to the storage path with which the switching unit is associated.

Although I have shown and described a single embodiment of my invention, I do not wish to be limited to the particular arrangements set forth and I intend in the following claims to cover all modifications which do not depart from the spirit and scope of my invention.

I claim:

1. Arrangement for automatically controlling an article handling system comprising a driven conveyor for the articles, whereby each article transported on the conveyor is intended to be discharged to a given one of a number of side or storage paths by devices which function to control the advancing of the articles on the conveyor, characterized by a mechanical memory working in conjunction with the conveyor, each article transported by said conveyor being represented by a free body, for instance a ball or the like, fed forward through the mechanical memory in a path of movement defining a closed circuit, further by means for controlling the feeding of the free bodies in the mechanical memory and, finally, by means for actuating, depending on the positions of the free bodies, the devices arranged to control the advancing of the articles on the conveyor, the mechanical memory comprising a rotatable body, for instance a drum or a band, which along its periphery has a number of notches or hollows placed in rows, each of the free bodies being arranged to follow the movement of the rotating body after being placed in such a hollow of one of said rows, such movement of a free body in a hollow of the rotating body defining one part of the path of movement through the mechanical memory for that free body during which the free body is raised while in physical contact with the rotating body, the mechanical memory also comprising gravitation channels each defining another part of the path of movement for each free body during which the free body moves downward by gravity while out of physical contact with the rotating body, the gravitation channels corresponding to the rows located on the rotatable body, each of the free bodies being arranged to be fed into said gravitation channels after it has followed a hollow around the periphery of the rotatable body and wherefrom the free bodies are arranged to be discharged in order to be placed into the hollows, when articles corresponding to the free bodies are to be transported on the conveyor toward predetermined side paths, the gravitation channels for every row of hollows corresponding to a side path being divided into a collecting channel and a memory channel, the collecting channel being arranged to receive the free bodies after they have completed at least one-half revolution around the rotating body and to deliver the free bodies, one at a time, to the memory channel, when information about the destination of an article, that is a certain side path, is to be stored in the mechanical memory, said mechanical memory functioning to deliver the free bodies, one at a time, from the memory channel to the hollows of the rotating body, when an article is to be fed onto the conveyor.

2. Arrangement according to claim 1, characterized in that each of the collecting channels is provided with a discharge device consisting of two tongues placed above each other, each possessing a hole, said tongues being actuated simultaneously by a drawing magnet, whereby the hole of the lower tongue is displaced in such a manner in relation to the hole of the upper tongue that under the influence of the drawing magnet only one free body at a time, said body having earlier passed through the hole of the upper tongue, is allowed to pass through the hole of the lower tongue.

3. Arrangement according to claim 1 characterized in that the memory channels corresponding to the different rows of hollows are provided with a common discharge device consisting of two tongues placed above each other and actuated by a drawing magnet, said tongues being provided for each memory channel with a hole in the upper tongue and another hole in the lower tongue displaced in relation to the upper hole, whereby under the influence of the drawing magnet only one free body at a time, which has earlier passed through the hole of the upper tongue, is allowed to pass on its way from every memory channel through the hole of the lower tongue.

4. Arrangement according to claim 1, characterized in that the memory channels are provided with a number of common stop tongues actuated by drawing magnets, said t ongues possessing a hole for each memory channel and being arranged in such a manner that the free bodies corresponding to articles and placed in the memory channels are advanced under the gradual influence of said drawing magnets, one step at a time, toward the discharge device of the memory channels, whereby a number of orders stored in the mechanical memory concerning destinations of a number of articles are gradually and automatically carried out, said orders being represented by the free bodies fed to the different memory channels.

5. Arrangement according to claim 4, characterized in that the free bodies are arranged in such a way that while they are in said hollows they pass and thus actuate a number of electric contacts, which are placed around the periphery of the rotating body in such a manner that the time when a free body closes an electric contact corresponds to the moment when the article represented by the free body has been advanced exactly toward the side path whereto said article is supposed to be transferred.

6. Arrangement according to claim 5, characterized in that the electric contacts, while actuated by the free bodies, are arranged to send electrical impulses for controlling the feed switches located at the side paths.

7. Arrangement according to claim 6, characterized in that the free bodies are arranged to pass and close a synchronizing contact at a certain time in relation to the time when they are placed in a hollow of the rotating body and, thus, to impart an electrical impulse to a synchronizing stop located at the beginning of the conveyor, said stop being arranged to feed one article at a time onto the conveyor.

8. Arrangement according to claim 4, characterized in that the drawing magnets of the discharge devices in the collecting channels are arranged to be operated by electrical impulses produced automatically or manually, whereby in the first case a punched card reader, punched tape reader or the like is arranged to close electrical circuits containing relays, the contact of said relays thereby imparting electrical impulses corresponding for instance to holes of the punched card, while in the second case a number of push buttons or the like are arranged to be operated manually for production of impulses.

9. Arrangement according to claim 8, characterized in that the produced impulses also act on a stepping selector arranged to step forward one step for every impulse received and thereby to close electrical circuits containing the drawings magnets coupled to the stop tongues of the memory channels, whereby for each step of the stepping selector a certain drawing magnet is actuated, by means of which the free bodies gradually fed into the memory channels are advanced different distances and, thus, get inside the memory channels different locations in relation to each other.

10. Arrangement according to claim 9, characterized in that the impulses are arranged to be brought to the stepping selector with a certain delay.

11. Arrangement according to claim 10, characterized in that the electrical circuits containing the drawing magnets of the memory channels also contain contacts for a number of relays connected to the stepping selector in such a manner that one relay at a time is arranged to be excited as the stepping selector takes different positions corresponding to the individual relays.

12. Arrangement according to claim 11, characterized in that consecutive relays have an increasing number of contacts belonging to said circuits and as the stepping selector moves one step ahead and the subsequent relay is excited, the preceding relay breaks whereby the contacts of the subsequent relay are arranged to substitute the functions of all the contacts belonging to the preceding relays, whereby the drawing magnets energized earlier via the stepping selector remain energized.

13. Arrangement according to claim 12, characterized in that a number of electric contacts placed on the conveyor are arranged to close gradually as an article is passing, whereby relays connected to said contacts are arranged to break and close again the circuits containing the drawing magnets of the memory channels, whereby all free bodies located in the memory channels are advanced one step ahead.

14. Arrangement according to claim 13, characterized in that an electric contact located at the conveyor is arranged to close when an article is passing and thereby to impart an electrical impulse to the stepping selector, thus moving said selector one step back.

15. Arrangement according to claim 14, characterized in that an electric contact located at the charging end of the conveyor is arranged to close when an article is passing and thereby to impart an impulse to the discharge device of the memory channels to discharge one free body to the rotating body, said free body corresponding to the article.

References Cited

UNITED STATES PATENTS

| | | | |
|---|---|---|---|
| 2,011,827 | 8/1935 | Regan | 214—11 |
| 2,717,086 | 9/1955 | Bush. | |
| 2,825,476 | 3/1958 | Muller. | |
| 2,936,081 | 5/1960 | Peras | 214—11 |
| 3,160,729 | 12/1964 | Lapham. | |

HUGO O. SCHULZ, *Primary Examiner.*

U.S. Cl. X.R.

198—81